United States Patent
Gilderman et al.

(10) Patent No.: US 10,509,696 B1
(45) Date of Patent: Dec. 17, 2019

(54) ERROR DETECTION AND MITIGATION DURING DATA MIGRATIONS

(71) Applicant: Amazon Technologies, Inc., Seattle, WA (US)

(72) Inventors: Ilia Gilderman, Bellevue, WA (US); Arun Kumar Thiagarajan, Seattle, WA (US); John MacDonald Winford, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 191 days.

(21) Appl. No.: 15/679,107

(22) Filed: Aug. 16, 2017

(51) Int. Cl.
*G06F 11/00* (2006.01)
*G06F 11/07* (2006.01)

(52) U.S. Cl.
CPC ........ *G06F 11/0793* (2013.01); *G06F 11/079* (2013.01); *G06F 11/0727* (2013.01); *G06F 11/0751* (2013.01)

(58) Field of Classification Search
CPC ............. G06F 11/0727; G06F 11/0751; G06F 11/079; G06F 11/0793
See application file for complete search history.

(56) References Cited

U.S. PATENT DOCUMENTS

| | | | |
|---|---|---|---|
| 7,299,216 B1 | 11/2007 | Liang et al. | |
| 7,770,053 B1* | 8/2010 | Bappe | G06F 11/0793 714/3 |
| 8,087,013 B2 | 12/2011 | Kelly et al. | |
| 8,312,323 B2 | 11/2012 | Gokhale et al. | |
| 8,977,896 B1* | 3/2015 | Thigpen | G06F 3/06 714/15 |
| 10,078,458 B1* | 9/2018 | Shapiro | G06F 3/0616 |
| 10,261,853 B1* | 4/2019 | Chen | G06F 11/079 |
| 2008/0115123 A1* | 5/2008 | Kelly | G06F 8/65 717/177 |
| 2009/0006493 A1* | 1/2009 | Draper | G06F 8/71 |
| 2011/0276821 A1* | 11/2011 | Gudlavenkatasiva | G06F 11/0751 714/3 |
| 2013/0198561 A1* | 8/2013 | Fleming | G06F 9/455 714/6.3 |
| 2013/0254463 A1* | 9/2013 | Matsunaga | G06F 12/0246 711/103 |
| 2014/0379669 A1* | 12/2014 | Driesen | G06F 16/214 707/690 |
| 2015/0019488 A1 | 1/2015 | Higginson et al. | |
| 2016/0063050 A1 | 3/2016 | Schoen et al. | |
| 2017/0031745 A1* | 2/2017 | Koike | G06F 11/079 |
| 2018/0217888 A1* | 8/2018 | Colgrove | G06F 11/0727 |

* cited by examiner

*Primary Examiner* — Joshua P Lottich
(74) *Attorney, Agent, or Firm* — Robert C. Kowert; Kowert, Hood, Munyon, Rankin & Goetzel, P.C.

(57) ABSTRACT

Errors may be detected and mitigated during the migration of data. Migration of data from a source data store to a target data store may be monitored for errors. When an error is detected, one or more responsive actions may be identified to modify performance of the migration. In some embodiments, responsive actions may include further analyses to validate the migration. In some embodiments, the responsive actions may be corrective actions to correct the detected error. Once identified, the responsive actions may be performed to modify performance of the migration.

20 Claims, 9 Drawing Sheets

ERROR DETECTION AND MITIGATION DURING DATA MIGRATIONS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by introducing different data stores or data formats that offer different processing or maintenance capabilities. However, introducing multiple data formats is not without cost. Data is often processed by different systems which may not support the current data format of the data. Thus, the ability to perform techniques to move data between data stores that offer different capabilities, locations, or formats is desirable.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of error detection and mitigation during data migrations processing are described herein. Data migration may be performed in various embodiments in order to move data from a current location to a desired new location. The new location may, for instance, utilize a different storage engine or have different storage capacity (or other hardware capabilities) that make accessing the data more desirable, in some embodiments. Data migration techniques may transform or otherwise modify the data as part of migration, in various embodiments. For example, data stored in a source data store may be stored in a data format (e.g., a file format, schema, etc.) that is different the data format used or supported by the target data store, in some embodiments. Data migration, therefore may convert the data from the format of the source data store to the format of the target data store, in one embodiment.

Figure 1:
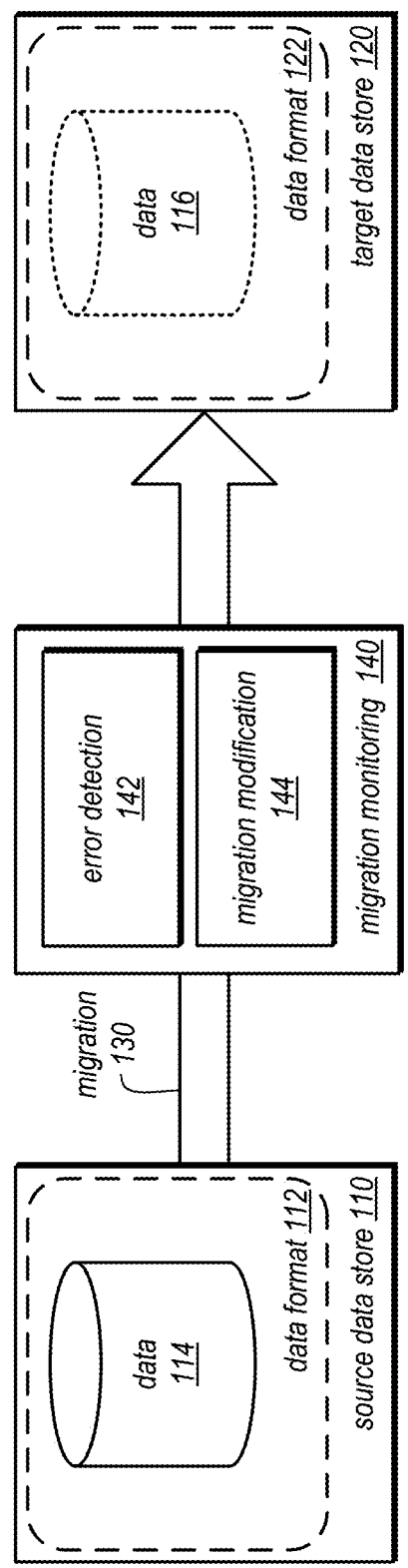
FIG. 1 is a logical block diagram illustrating error detection and mitigation during data migrations, according to some embodiments.

Because data migrations can move large amounts of data, data migration operations may be costly in terms of resources and time to perform, in some embodiments. When data migrations fail to complete due to errors or fail to provide correct results even if all of the data is migrated due to errors, the resulting loss may be great, in one embodiment. Error detection and mitigation that can be performed during data migrations, however, can significantly reduce the costs of data migration errors by identify and correcting errors before the costs of the error become large. FIG. 1 is a logical block diagram illustrating error detection and mitigation during data migrations, according to some embodiments.

Source data store 110 may store data 114 according to a data format 112. Source data store may be various kinds of database system (e.g., relational or non-relational), file system, object store (e.g., a key-value object store), virtualized storage device (e.g., virtual block-based storage devices, such as virtual hard disk drives), or any other data store that may store data 114. Data format 112 may be an arrangement, schema, or other manner in which the data is stored at source data store (e.g., logically or physically) that may be compatible with how source data store 110 provides access to the data. If, for instance, source data store 110 is a data warehouse that is compatible with data store in a column-oriented storage format, then data format 112 may be a column-oriented format in which data 114 is stored.

Migration 130 may be performed to move data 114 to a target data store 120. Target data store 120 may also be various kinds of database system (e.g., relational or non-relational), file system, object store (e.g., a key-value object store), virtualized storage device (e.g., virtual block-based storage devices, such as virtual hard disk drives), or any other data store that may store data 114. Similarly, data format 122 may be an arrangement, schema, or other manner in which the data is stored at source data store (e.g., logically or physically) that may be compatible with how target data store 120 provides access to the data. Migration 130 may obtain portions of data 114 (e.g., records, entries, objects, folders, files, etc.) and may transform the obtained portions for storage in target data store to be a version of the data, data 116, that is stored in data format 122 in target data store 120. Other operations may include filtering, aggregating, dividing, calculating over, appending, or otherwise altering data 114 as it is stored to target data store 120 in some embodiments.

Migration monitoring 140 may monitor migration 130 and may perform error detection 142, in some embodiments. Errors detected by error detection 142 may include various kinds or types of errors detected according to different error detection criteria and different source data which may indicate an error, in some embodiments. For example, errors may be detected with respect to the performance operations as part of migration (e.g., operations to obtain or store data, operations to transform or modify data, etc.). In some embodiments, errors may be detected with respect to the performance of resources that are performing the data migration (e.g., computing resources implementing source data store 110, target data store 120, or third party migration computing resources, such as migration workers discussed below with regard to FIGS. 3 and 4). Errors may be detected with respect to environmental or operating conditions for the migration, such as network configuration errors or security related errors, in some embodiments. Errors may be detected with respect to the desired migration, such as unsupported data types specified for target data store or unsupported storage formats, in some embodiments.

Migration monitoring 140 may also implement migration modification 144 which may select and perform responsive actions to detected errors in order to modify 130 to resolve, cure, or avoid the error. For example, migration modification 144 may select responsive actions that perform further analyses on the migration, such as various validation operations with respect to the configuration of the migration, the configuration of source data store 110 or target data store 120, or the performance of the migration. Responsive actions may also include corrective actions that may, for instance, alter the way in which some data (e.g., data values from a column of a table) are written to target data store 120. Some responsive actions may be performed automatically without user intervention or permission, while other responsive actions may be provided as options or recommendations to a user, which a user may accept or reject (as discussed below with regard to FIGS. 5A-5C), in some embodiments. By detecting errors and pursuing actions that can modify migration 130, costly errors that waste time and other resources to perform a flawed or failed migration may be corrected before continuing migration 130 (instead of discovering and attempting to correct errors after migration fails or is discovered to be faulty).

Please note that the previous description of error detection and mitigation during data migration is a logical illustration and thus is not to be construed as limiting as to the architecture for implementing a data store, data format, migration monitor, migration operations.

This specification begins with a general description of a provider network that implements data migration service that migrates data both within and outside of the provider network while performing error detection and mitigation. Then various examples of the data migration service including different components/modules, or arrangements of components/module that may be employed as part of implementing the data migration service are discussed. A number of different methods and techniques to implement error detection and mitigation during data migration are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
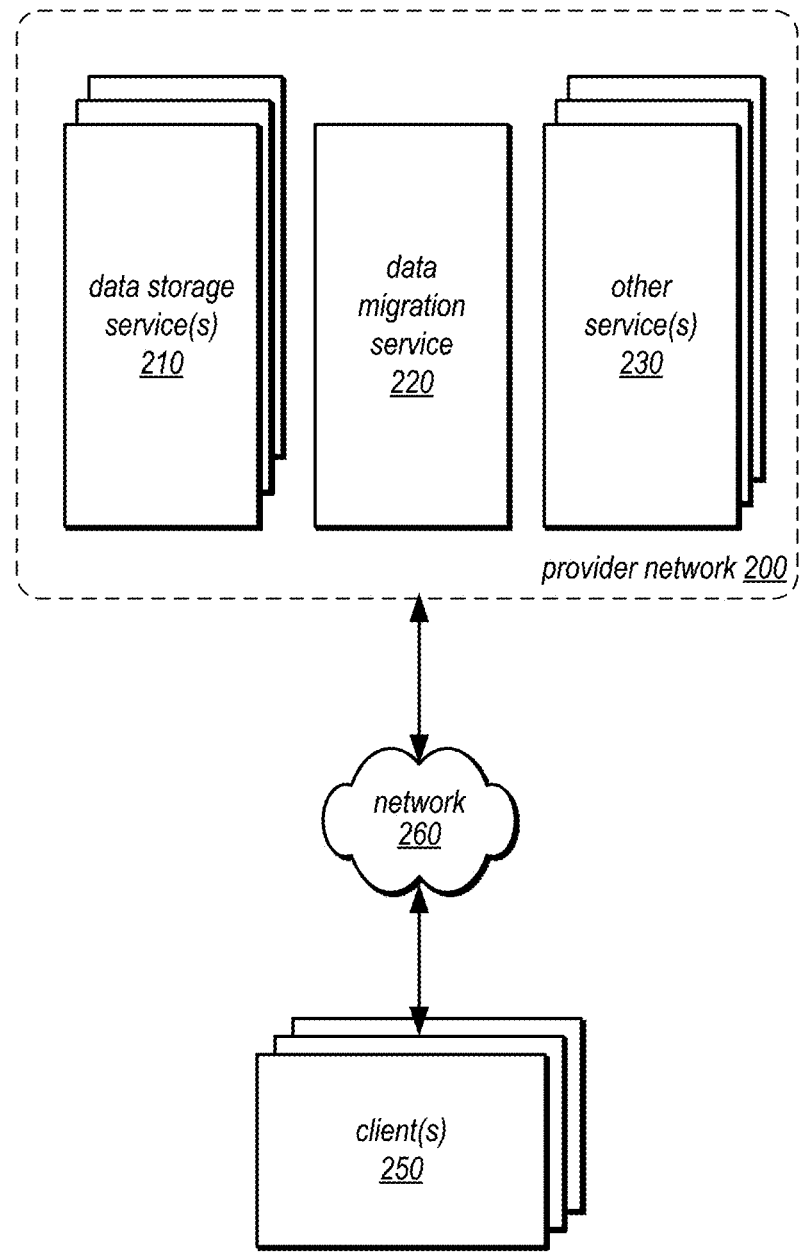
FIG. 2 is a logical block diagram illustrating a provider network offering different services including data migration service that performs error detection and mitigation, according to some embodiments.

FIG. 2 is a logical block diagram illustrating a provider network offering different services including data migration service that performs error detection and mitigation, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. In some embodiments, provider network 200 may implement various computing resources or services, such as a data storage service(s) 210 (e.g., database services, object storage services, block-based storage services, or data warehouse storage services), data migration service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs), command line interfaces, and/or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Figure 3:
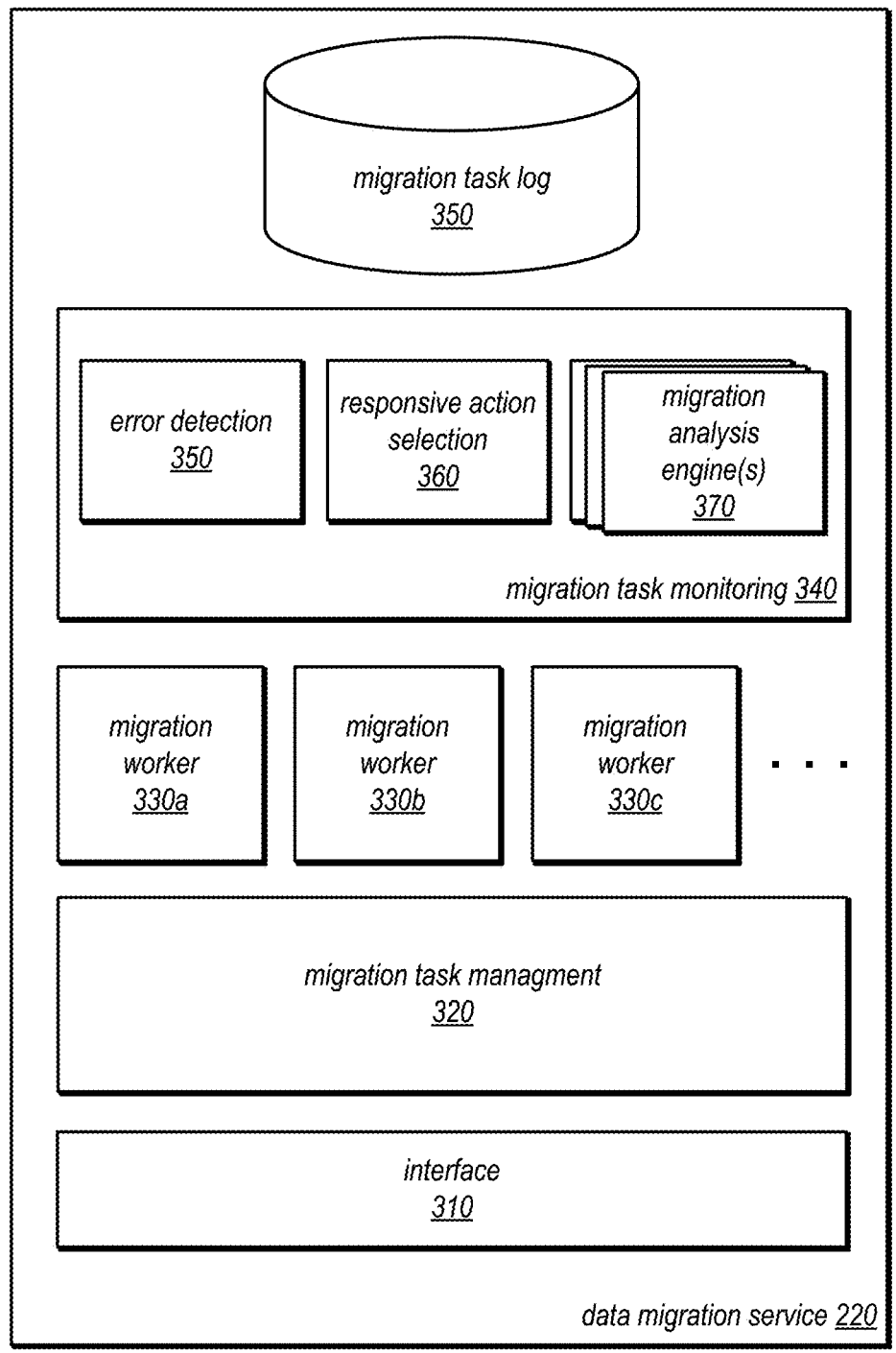
FIG. 3 is a logical block diagram illustrating a data migration service, according to some embodiments.

In some embodiments, data migration service 220 may perform data migrations between data stores. For example, data migration service 220 may perform homogenous migrations where the source and target data stores are the same or are compatible (e.g., the same or compatible storage engines, such as the same database engines). In some embodiments, data migration service 220 may perform heterogeneous migrations, where the source and target data stores are different or otherwise not compatible (e.g., different or incompatible storage engines, schemas, file or other data formats, such as different database engines). One or both of source or target data stores may be external to provider network 200 in some embodiments. Alternatively, one or both of source or target data stores may be hosted or implemented within provider network 200 (e.g., on the same or different storage services 210). For heterogeneous migrations, data migration service 220 may automatically convert the data format (e.g., database schema) to a format compatible with the target data store (e.g., a target database schema), in some embodiments. Data migration service 220 may consolidate or combine multiple data sets into a single data store (e.g., multiple databases into one database). FIG. 3 provides further discussion of data migration service 220 below. Data migration service 220 may perform a single copy of data from one data store to another or may provide continuous replication of changes at a source data store to a target data store, in some embodiments.

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of data migration 220 in order to invoke the execution of a migration task to make data available for processing in a different location or data format for performing various processing operations with respect to data sets stored in data storage service(s) 210.

Generally speaking, clients 250 may encompass any type of client configurable to submit network-based requests to provider network 200 via network 260, including requests for storage services (e.g., a request to create, read, write, obtain, or modify data in data storage service(s) 210, a request to generate an ETL job at ETL service 220, etc.). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

FIG. 3 is a logical block diagram illustrating a data migration service, according to some embodiments. Data migration service 220 may implement interface 310, in various embodiments. Interface 310 may provide support various types of interfaces, in some embodiments, including a programmatic interfaces (e.g., Application Programming Interfaces (APIs)), command line interfaces, and/or graphical user interfaces. In some embodiments, a management console or other component may coordinate the generation and implementation of various graphical user interfaces, such as those discussed below with regard to FIGS. 5A-5C. Interface 310 may dispatch various requests to appropriate data migration service components, such as migration task management 320, as discussed below with regard to FIG. 4.

Data migration service may implement migration task management 320 to manage the resources performing data migration and direct the performance data migration according to received migration tasks. Migration task management 320 may generate workflows or other execution plans for migration tasks, in some embodiments. For example, depending on the configuration of the task, migration task management 320 may include different operations within a workflow to perform a task. For instance, heterogeneous migrations may include operations to convert, transform, or otherwise modify data taken from one data store in order to be compatible with a scheme in a target data store. In another example, a homogenous migration may include a configuration that filters out some data when the data is migrated so that it is not included in the data in the target data store. Migration task management 320 may create a workflow that includes filter operations to apply the desired filter.

Figure 4:
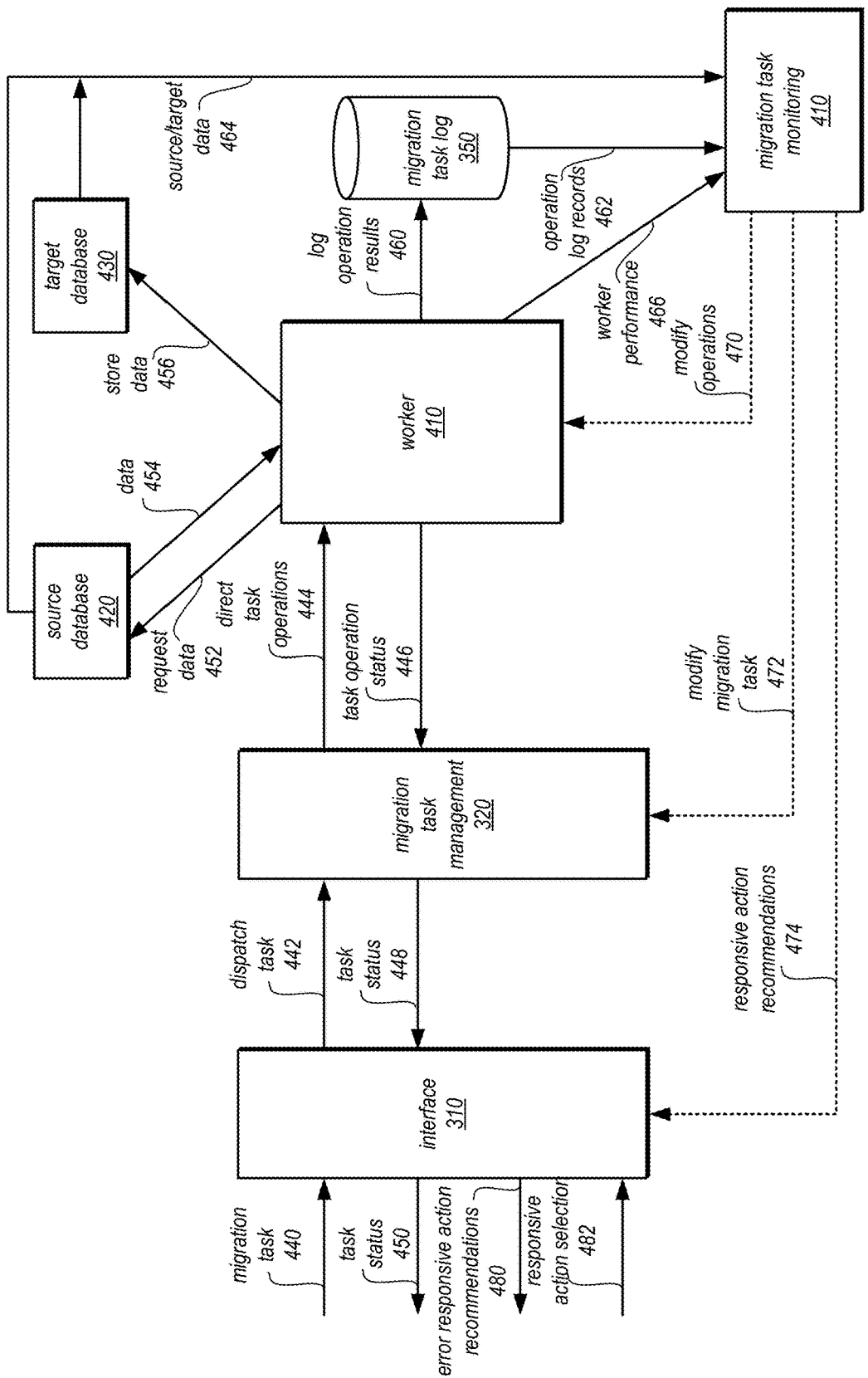
FIG. 4 is a data flow diagram illustrating the performance of error monitoring during migration tasks at a data migration service, according to some embodiments.

Migration task management 320 may determine and provision the appropriate number of migration workers 330 to perform a migration. Although FIG. 4 illustrates a single migration worker, in some embodiments, parallel or distributed execution of a migration task may be performed amongst a group of migration works for a single migration task. Migration management may track the status of migration tasks, restart or resume migration tasks, and clean up, release, scrub or prepare migration workers 330 for performing another migration task, in some embodiments.

Data migration service 220 may implement multiple migration workers, such as migration workers 330a, 330b, 330c, and so on, in various embodiments. Migration workers 330 may perform the various operations to perform heterogeneous and homogenous migrations, in some embodiments. Migration workers 330 may read, convert, truncate, modify, reformat, divide, combine, filter, calculate, write, or store data in order to migrate data from a source data store to a target data store, in some embodiments. Migration workers may log operation results or status in migration task log 350, in some embodiments.

In at least some embodiments, data migration service 220 may implement migration task monitoring 340 which may monitor for errors during performance of migration tasks and select responsive actions for the errors. Migration task monitoring may implement error detection 350, which, as described in detail below with regard to FIG. 7, may collect various types of information for monitoring for errors. For example error detection 350 may aggregate, poll for, request, receive via push notifications, or otherwise obtain monitoring data using one or multiple data gathering methods. The various types of monitoring data collected by error detection 350 may include log data describing the execution of the migration, performance metrics, status reports, configuration information, or other data describing the computing resources performing the migration, the content the migration task such as operations or instructions evaluated and/or performed as part of the migration, or data that describes the source or target data stores (e.g., metadata describing source or target data store configurations) or portions of the data being migrated that reside on the source or target data store. Error detection 350 may apply criteria corresponding to different possible errors may be evaluated with respect to the collected information. In some embodiments, different criteria may be evaluated for different types of migrations (e.g., copy only or replicating subsequent changes). In some embodiments, error criteria may be dependent on the source or target databases, source or target formats, time period of migration (e.g., peak hours vs. off-peak hours), etc.

Migration task monitoring 340 may implement responsive action selection 360, in some embodiments, to select responsive actions according to detected errors. For example, mapping information or other classifying information may link errors to particular responsive action(s) or sets of responsive actions, in some embodiments. In some embodiments, multiple classification and selection techniques may be implemented separately or in combination. For example, the criteria that triggered the error and other criteria, such as performance metrics for the computing resource(s) performing the migration may be used as features to apply a machine-learning or other statistically derived model to select the appropriate responsive action(s), in some embodiments.

Responsive actions may include pausing the migration, notifying a user of the error, requesting from a user permission to perform further responsive actions (e.g., analyses or corrective actions), automatically performing responsive actions (e.g., analyses or corrective actions), providing manual migration task corrections or other modifications to a user, restarting migration at a prior point in time prior to the detection of the error, at the beginning of the migration task, or at a point at which migration was paused, and making retroactive corrections (e.g., reformatting data already copied to the second database) before continuing migration according to operations that perform correctly, in various embodiments.

As illustrated in FIG. 3, various migration analysis engines 370 may be implemented to perform different kinds of analysis selected as a responsive action. For example, migration analysis engines 370 may check for unsupported data types at a target data store, conversion errors or changes, character set mismatch, improper network configuration, invalid or faulty permissions to access data, invalid or incorrect source and/or target data store configurations, invalid or improper task configurations, or unsupported data format errors. The performance of these analysis engines 370 may be provided to a user, as discussed below, and used to select further responsive actions, including corrective actions, in some embodiments.

FIG. 4 is a data flow diagram illustrating the performance of error monitoring during migration tasks at a data migration service, according to some embodiments. A client, such as client 250 in FIG. 2, may send a migration task 440 to data migration service via interface 310. The migration task 440 may identify data to migration, a source data store migrate the data from, such as source database 420, a target data store to migrate the data to, such as target database 430, and a configuration for the migration task, in some embodiments. For example, the configuration may specify modifications to be made to the data (e.g., in addition to a data format conversion), such as modifications to filter out data, modify or convert data values, generate new data values from the data (e.g., performing mathematical operations upon data values to generate new data values), truncation of data values, etc.

Interface 310 may dispatch the task 442 to migration task management 320. Migration task management 320 may identify or generate a workflow for performing the task, in some embodiments. Migration task management 320 may provision worker 410 to perform the migration task and being directing task operations 444 to worker 410. Worker 410 may request data 452 from source database 420, receive the data 454, perform any requested modifications or other operations for the migration task and then store the data 456 to target database 430. Worker 410 may update migration task management 320 with the status or completion of different task operations 446. Worker 410 may also log operation results 460 in migration task log (e.g., read, write, conversion, modification, truncation, etc. to record A succeeded or failed). Migration task management 320 may determine the overall task status of the migration task and provide the task status 448 to interface 310 (which may display or notify a client 450 of the task status (e.g., complete, in progress, failed, error detected, etc.).

Migration task monitoring 410 may collect data from different sources to monitor for errors. For example, migration task monitoring 410 may receive worker performance metrics 466 from work 410 (e.g., CPU, I/O bandwidth, memory utilization), operation log records 462 from migration task log 350, source/target data 464 from source database 420 and target database 430 (e.g., database configuration information, database schema or other metadata, data values stored as a result of the migration). Migration task monitoring 410 may detect errors based on the collected data, select and then perform or otherwise cause responsive actions, including performing further analysis (e.g., not illustrated), modifying the operations of the task at worker 410, modifying the migration task 472 at migration task management 320, and/or providing recommendations for responsive actions 474 via interface as error responsive action recommendations 480. Responsive selection 482 may be received interface 310 (which may be dispatched to migration task management 320 or migration task monitoring 410 in order to perform a responsive action according to the selection 482.

Figure 5A:
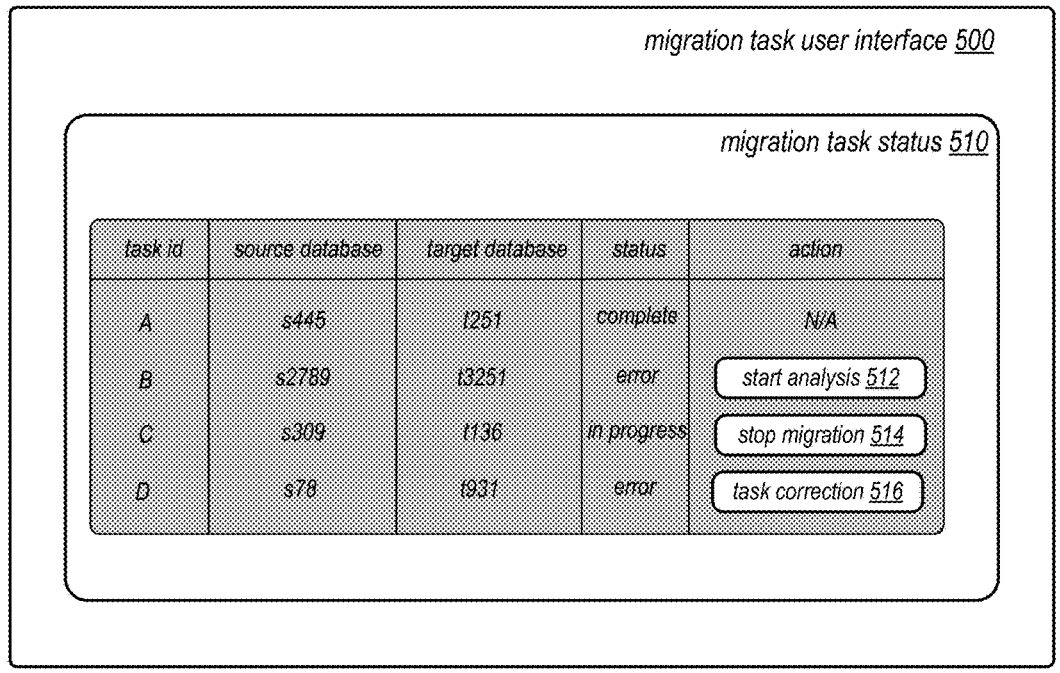
FIGS. 5A-5C are example user interfaces for detected errors for migration tasks, according to some embodiments.

FIG. 5A is an example migration task status user interface, according to some embodiments. Migration task user interface 500 may be implemented as part of interface 310 of data migration service 220. Migration task user interface 500 may implement various graphical user interface elements, such as buttons, dials, text entry, drop down lists, popup windows, or other display/interface elements to perform various migration task operations (e.g., including the creation, modification, or deletion of migration tasks, not illustrated). In some embodiments, migration task user interface 500 may implement migration task status element 510, as illustrated in FIG. 5A.

Figure 5B:
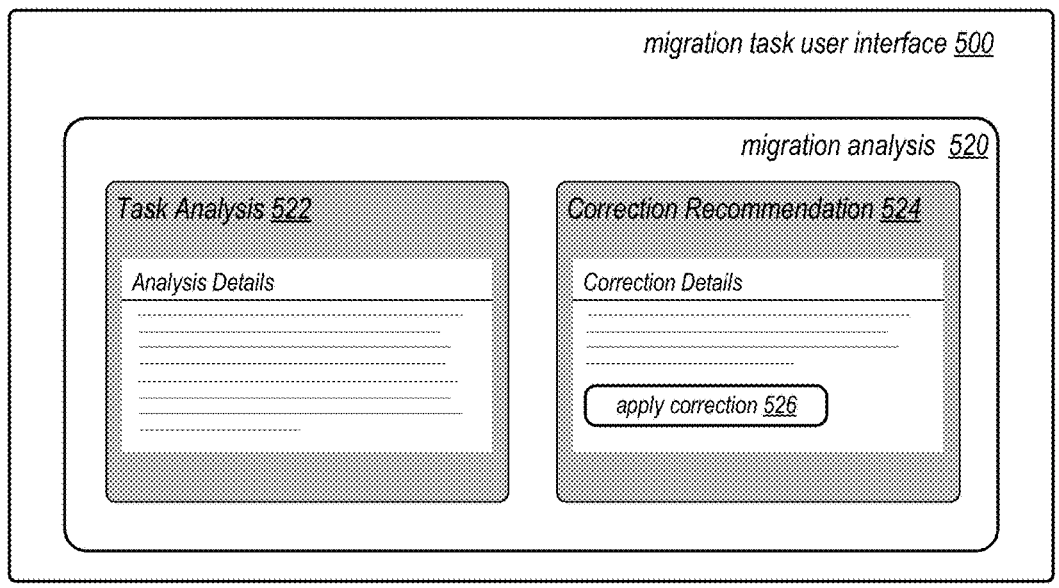

Migration task status 510 may display various migration tasks that have been created in data migration service 220. For example, migration task status may display various details such as a task identifier, (e.g., "A" "B" "C" "D"), source database or other storage service identifiers (e.g., "s445", "s2789", "s309", "s78"), target database or other storage service identifiers (e.g., "t251", "t3251", "t136", "t931"), current task status (e.g., "complete" "error" "in progress" or others not shown, such as "paused"). In some embodiments, actions, including responsive actions identified for detected errors may be displayed or provided for migration tasks. For example, for task "B" an analysis action 512 may be triggered by the selection of the start analysis user interface element 512. FIG. 5B, discussed below, illustrates an example user interface that may be displayed as a result of selecting start analysis 512. For task "C", which is currently "in progress," an option to select a stop migration element 514 which may pause or cancel performance of migration task "C" in some embodiments. For task "D" a task correction element 516 may trigger the performance of a responsive action that corrects a detected error in the migration task, in some embodiments, as discussed below with regard to FIG. 5C.

FIG. 5B is an example migration task user interface that implements a migration analysis element 520, in some embodiments. Migration analysis element 520 may display the results of one or more analyses applied to a migration task as responsive actions (e.g., selected in FIG. 5A above). Task analysis area 522 may, for example, provide results of the one or more different validations or other operations performed to determine a root cause or contributing cause to the detected error for task "B". Although not illustrated in FIG. 5B, in some embodiments, task analysis 522 may be interactive (e.g., soliciting user input in order to refine or perform analysis). Migration analysis element 520 may, in some embodiments, include correction recommendation area 524. Correction recommendation area may detail the one or more corrective actions that may be performed to cure the detected error. For example, operations that modify a transformation operation, such as a truncation or conversion, may be specified along with retroactive corrections that may be applied. In some embodiments, alternative corrective actions may be displayed (e.g., corrective actions that continue on with the migration or that restart the migration task with a corrected configuration). Users may select apply correction element 524, in various embodiments, to confirm, initiate, or otherwise give permission to perform the described corrective action, in some embodiments. In some embodiments, correction details may describe manual corrective actions that a user may performed (e.g., via interface 310 to modify the migration task), in some embodiments.

Figure 5C:
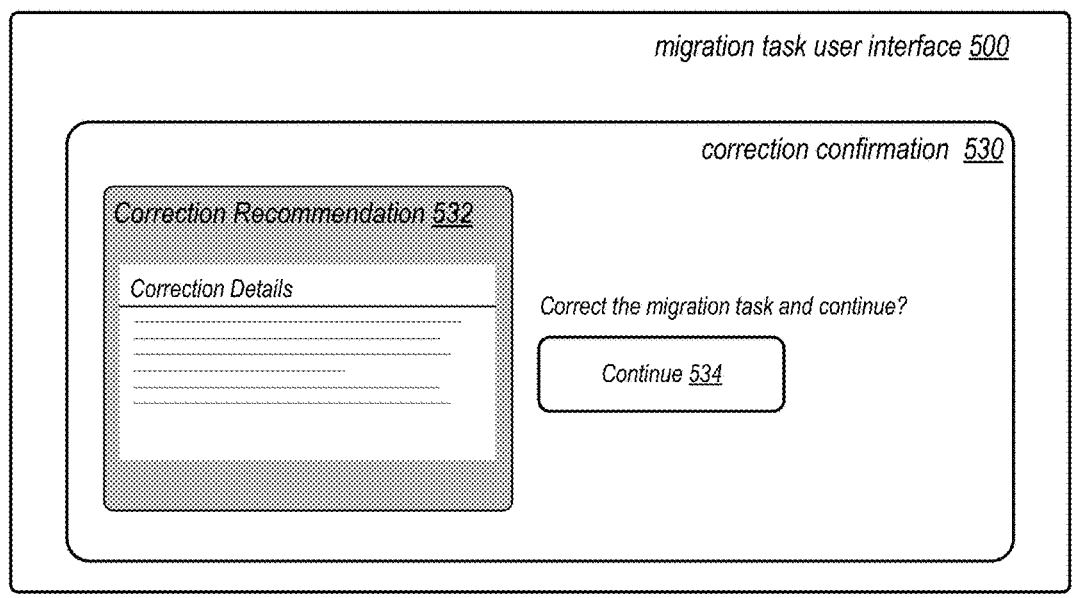

FIG. 5C is an example migration task user interface that implements a correction confirmation element 530, in some embodiments. Similar to FIG. 5B discussed above, correction confirmation element 530 may include correction recommendation 532. Correction recommendation 532 may detail the one or more corrective actions that may be performed to cure the detected error. In some embodiments, alternative corrective actions may be displayed (e.g., corrective actions that continue on with the migration or that restart the migration task with a corrected configuration). Users may select continue element 534 to perform the corrective action recommended, in various embodiments. In some embodiments, correction details may describe manual corrective actions that a user may performed (e.g., via interface 310 to modify the migration task), in some embodiments and thus in such embodiments, continue element 534 may not be provided.

Figure 6:
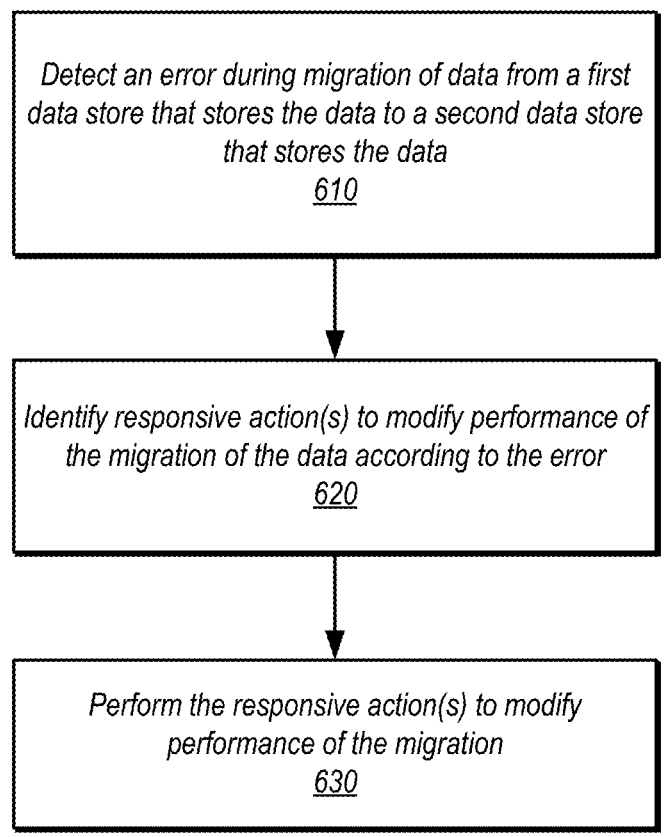
FIG. 6 is a high-level flowchart illustrating methods and techniques to implement error detection and mitigation during data migrations, according to some embodiments.

Although FIGS. 2-5C have been described and illustrated in the context of an data migration service, the various techniques and components illustrated and described in FIGS. 2-5C may be easily applied to other data access or management systems in different embodiments that may facilitate data migration operations, such as data stores or other services that offer extract transform load (ETL) processing operations. As such, FIGS. 2-5C are not intended to be limiting as to other embodiments of a system that may implement error detection and mitigation during data migrations. FIG. 6 is a high-level flowchart illustrating methods and techniques to implement error detection and mitigation during data migrations, according to some embodiments. Various different systems and devices may implement the various methods and techniques described below, either singly or working together. For example, a data migration service such as described above with regard to FIGS. 2-5C may implement the various methods. Alternatively, a combination of different systems and devices, such as a storage subsystem that manages access to data stored in directly attached storage devices may migrate data to another data store using error detection and mitigation during data migrations as described in the below techniques. Therefore, the above examples and or any other systems or devices referenced as performing the illustrated method, are not intended to be limiting as to other different components, modules, systems, or configurations of systems and devices.

As indicated at 610, an error may be detected during migration of data from a first data store that stores data to a second data store, in various embodiments. As discussed above with regard to FIG. 1, data stores may store data according to a data format, in at least some embodiments. For example, different file formats may be used to stored data that is accessed according to particular storage engine (e.g., a type of relational database storage engine). Different data stores may implement different storage engines (e.g., different relational database engines), and thus the migration of the data from the first data store to the second data store may include the modification, conversion, or transformation of the format data (e.g., from first format to second format). In some embodiments, the data stores may be homogenous, utilizing a same data format. Different types of migrations may be performed, such as migrations that copy data as it exists at the time the migration begins or migrations that capture changes to the data at the first data store (e.g., source data store) and replicate them to the second data store (e.g., target data store)—even if that portion of the data has already been migrated, in some embodiments.

Various kinds or types of errors may be detected according to different error detection criteria and different source data which may indicate an error. For example, log data describing the execution of the migration may be analyzed to detect an error by searching for various failure conditions, such as failed attempts to convert, transform, write or store data, in some embodiments. If for instance, and indication of individual failure (and/or success) of individual operations (or sets of operations) is stored in the log, then type of operation may be identified as well as the failed operation (e.g., conversion, transformation, write, or store). In another example, performance metrics, status reports, configuration information, or other data describing the computing resources performing the migration may be evaluated with respect to performance criteria (e.g., utilization thresholds for a central processing unit (CPU), input/output (I/O) bandwidth, or memory, latency or drop rates for communications with source and target data stores or other network/connectivity data, in some embodiments.

Another example of data that may be evaluated to detect errors during migration may be operations or instructions evaluated and/or performed as part of the migration (e.g., as part of a migration task). For example, missing or invalid read, copy, transform, convert, truncate, filter or other operations may be identified (e.g., according to operation or instruction validation that is performed as an operation is read, received, or otherwise identified for performance), in some embodiments. Data that may be evaluated to detect errors may include data that describes the source or target data stores (e.g., metadata describing source or target data store configurations) or portions of the data being migrated that reside on the source or target data store, in some embodiments. For example, data schemas for the data (e.g., table schema and other database table metadata) may be evaluated and compared to the actual data stored to detect errors between expected data and received data (e.g. the target table schema may indicate that data for a column is string data but the data being stored as part of the migration may be integer data).

As indicated at 620, responsive action(s) to modify performance of the migration of the data may be identified according to the error, in some embodiments. Different types of responsive actions may be performed. For example, responsive actions may be further validation or other analysis of the migration, in some embodiments. The validation or other analysis may be interactive, in some embodiments, guiding a user through various questions, selections, or other data gathering operations in order to complete the analysis. For example, suspect configuration information for the migration (which may have caused the error) may be presented to a user, to confirm or deny whether the suspect configuration information is correct as part of an interactive validation analysis. In some embodiments, responsive actions may include automated mitigation or correction of detected errors. For example, the error may indicate that insufficient storage space at the second data store is available to continue migration of the data. An automated correction may send one or more requests or instructions to provision or allocate additional storage space in the data store for the data, in one embodiment. In some embodiments, responsive actions may include generating recommended actions to provide to a user via an interface, such as interface 310 of data migration service. For example, a user interface element may display alternative analyses or corrective actions that may be selected by a user to correct the migration of the data.

As indicated at 630, the responsive action(s) to modify performance of the migration, in various embodiments. If, for instance, the responsive action(s) include providing recommendations of analyses or corrective actions and performing selected analyses or corrective actions, then interface elements may be generated and provided to provide the recommendations, event listeners or other interface elements implemented to capture selections and perform the selected actions, in some embodiments. In at least some embodiments, responsive actions, including analyses or corrective actions may be performed automatically without user permission or selection. For example, network configuration validation checks (in the event of network-related errors) may be automatically performed, in some embodiments, in response to the detection of the error.

Figure 7:
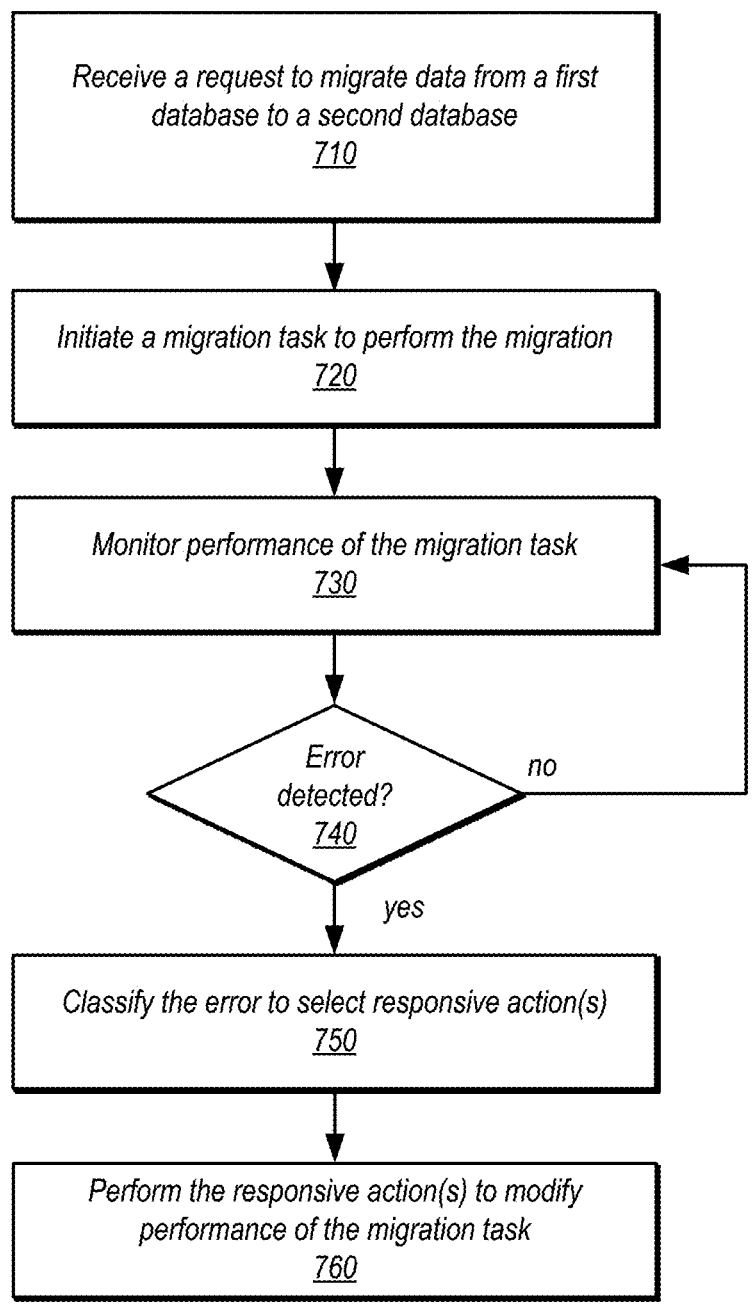
FIG. 7 is a high-level flowchart illustrating methods and techniques to implement monitoring for errors and responsive action selection during migration tasks, according to some embodiments.

FIG. 7 is a high-level flowchart illustrating methods and techniques to implement monitoring for errors and responsive action selection during migration tasks, according to some embodiments. As indicated at 710, a request may be received to migrate data from a first database to a second database, in some embodiments. Different database formats may be used by different database engines that are implemented for the different databases, in some embodiments. In some embodiments, the databases may be homogenous utilizing a same data format. Different database formats may include different file formats or arrangements of data, logically, or physically (e.g., column-oriented storage which stores column values of different rows together in a same page or block in physical storage or row-oriented storage which stores all values of a row, record, or entry in a same page or block in physical storage). A migration may be requested according to the submission of a task describing various features or operations to be performed as part of the migration, as discussed above with regard to FIG. 4. In some embodiments, the request may be formatted according to a programmatic interface (e.g., an API), command line interface, and/or graphical user interface. The request may specify the identity of the first database and the second database or may specify the identity of the first database and provide a desired type or configuration for the second database (which may be procured, provisioned, launched or otherwise obtained to receive the data).

As indicated at 720, a migration task may be initiated to perform the migration, in some embodiments. For example, as discussed above with regard to FIG. 4 one or more migration workers, systems, or devices may be provided with instructions or operations to perform some or all of the migration task, obtaining data from the first database and storing the data to the second database. Different operations specified as part of the migration, including transforming the data from the first format to the second format may be performed when storing the data to the second database. The state of the migration task may be tracked or recorded according to various task stages, operations, or other information that describes the performance of the migration (e.g., a migration workflow).

As indicated at 730, performance of the migration task may be monitored, in various embodiments. For example, various types of information may be collected, aggregated, polled for, requested, received via push notifications, or other data gathering methods, including, but not limited to, log data describing the execution of the migration, performance metrics, status reports, configuration information, or other data describing the computing resources performing the migration, the content the migration task such as operations or instructions evaluated and/or performed as part of the migration, or data that describes the source or target data stores (e.g., metadata describing source or target data store configurations) or portions of the data being migrated that reside on the source or target data store. Criteria corresponding to different possible errors may be evaluated with respect to the collected information. In some embodiments, different criteria may be evaluated for different types of migrations (e.g., copy only or replicating subsequent changes). In some embodiments, error criteria may be dependent on the source or target databases, source or target formats, time period of migration (e.g., peak hours vs. off-peak hours), etc. Monitoring criteria may change over the course of the performance of the migration. For example, schema checks, and other criteria that validates whether the data is being transformed correctly from the format of the first database to the format of the second database, for instance, may be performed within up to a percentage of data transferred or completion percentage of the migration operation (after which it may be safe to assume that the data transformation portions of the migration are being correctly performed). Other monitoring criteria, such as computing resource performance may be performed throughout the migration, in some embodiments.

If an error is detected, as indicated by the positive exit from 740, then as indicated at 750, the error may be classified in order to select responsive action(s), in some embodiments. For example, mapping information or other information may link errors to particular responsive action(s) or sets of responsive actions, in some embodiments. Consider an example, where network configuration errors are linked to a set of network configuration validation analyses that may be performed as the responsive action(s).

The classification of the error as a network configuration error may be determinative for selecting the responsive action(s) (e.g., the network configuration validation analyses). In some embodiments, further or alternative classification and selection techniques (or different ones) may be implemented. For example, the criteria that triggered the error and other criteria, such as performance metrics for the computing resource(s) performing the migration may be used as features to apply a machine-learning or other statistically derived model to select the appropriate responsive action(s), in some embodiments. Consider a machine learning model that is trained based on responsive actions performed for a same type of error detected for previous data migrations. Using the detected error and other collected information (e.g., from element 730 above), the model can be applied can to determine whether a corrective action can be automatically performed or if further analysis is needed.

As indicated at 760, the responsive action(s) may be performed to modify performance of the migration task. For example, the responsive action(s) may first pause the migration, in some embodiments (while in other embodiments the migration may continue after the error is detected). The responsive action(s) may seek user input by sending notifications, recommendations, or requests for permission or confirmation to perform further responsive actions (e.g., analyses or corrective actions). The responsive actions(s) may automatically perform analyses or corrective actions and may provide notification to a user upon completion of the analyses or corrective actions. In some embodiments, the results of further analyses may be used to select automated corrective actions or provide manual migration task corrections or other modifications to a user. In some embodiments, some analyses and/or corrective actions may be performed transparent to a user so that the migration task may be modified and continue to perform without further user input. In some embodiments, responsive actions may restart migration at a prior point in time prior to the detection of the error, at the beginning of the migration task, or at a point at which migration was paused. In some embodiments, responsive actions may make retroactive corrections (e.g., reformatting data already copied to the second database) before continuing migration according to operations that perform correctly.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
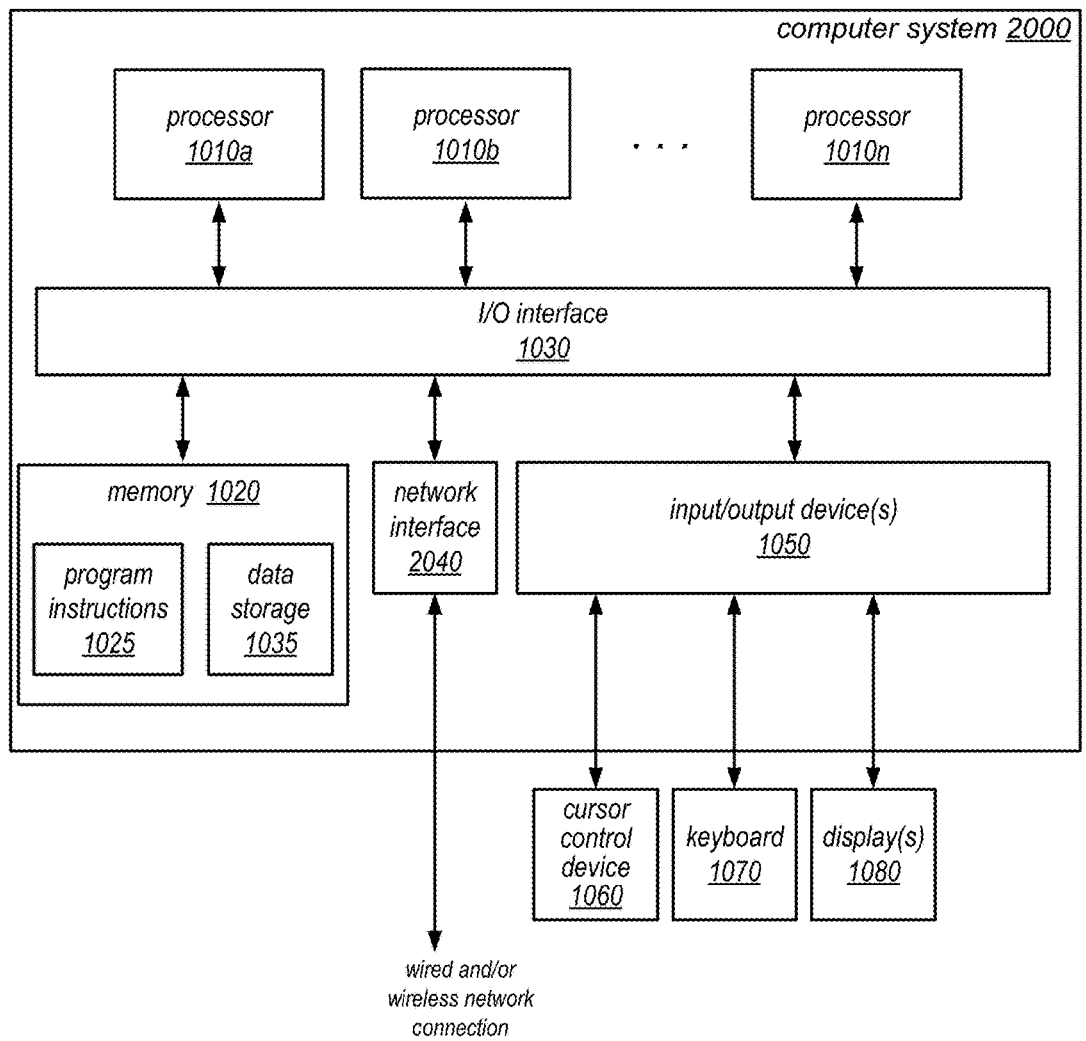
FIG. 8 illustrates an example system that may implement the various methods, techniques, and systems described herein, according to some embodiments.

Embodiments of error detection and mitigation during data migration as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system, compute system, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a memory to store program instructions which, if performed by at least one processor implemented as part of a data migration service of a provider network, cause the at least one processor to perform a method to at least:
   initiate performance of a migration task, the migration task including a migration of data from a first data store that stores the data and that is hosted external to the provider network to a second data store that is hosted as part of another service of the provider network;
   monitor the performance of the migration task to detect an error during the migration of data;
   select one or more responsive actions to modify performance of the migration of the data according to the error; and
   perform the one or more responsive actions to modify performance of the migration task.

2. The system of claim 1, wherein one of the responsive actions is a migration analysis that validates the migration task and wherein the method further causes the at least one processor to:
   provide a user interface element via a user interface to initiate performance of the migration analysis, wherein the migration analysis is an interactive analysis that collects input for the analysis via the user interface.

3. The system of claim 1, wherein one of the selected responsive actions is a corrective action that modifies performance of the migration to correct the detected error.

4. The system of claim 1, wherein the initiation of the migration task is performed in response to receiving a request to perform the migration task via an interface for the data migration service of the provider network.

5. The system of claim 1, wherein the first data store is a first type of database, wherein the second data store is a second type of database, and wherein the second data store is hosted within the provider network.

6. A method, comprising:
   detecting an error during a migration task associated with a data migration service of a provider network, the migration task including a migration of data from a first data store that stores the data and that is hosted external to the provider network to a second data store that is hosted as part of another service of the provider network;
   identifying one or more responsive actions to modify performance of the migration of the data according to the error; and
   performing the one or more responsive actions to modify performance of the migration.

7. The method of claim 6, further comprising providing user interface elements to initiate performance of at least one of the responsive actions via a user interface.

8. The method of claim 6, wherein one of the identified responsive actions is a corrective action that modifies performance of the migration to correct the detected error.

9. The method of claim 6, wherein performing the one or more responsive actions to modify performance of the migration comprises applying a corrective action retroactively to portions of the data already migrated to the second data store.

10. The method of claim 6, wherein one of the identified responsive actions is a migration analysis that validates the migration task.

11. The method of claim 10, further comprising:
    providing a user interface element via a user interface to initiate performance of the migration analysis, wherein the migration analysis is an interactive analysis that collects input for the analysis via the user interface.

12. The method of claim 6, wherein the identifying the one or more responsive actions comprises applying a machine learning model generated based on prior responsive action selections for the detected error.

13. The method of claim 6, further comprising restarting the migration in response to the performing the one or more responsive actions.

14. The method of claim 6, wherein the first data store is a first type of database, wherein the second data store is a second type of database, and wherein the second data store is hosted within the provider network.

15. A non-transitory, computer-readable storage medium, storing program instructions that when executed by one or more computing devices implemented as part of a data migration service of a provider network cause the one or more computing devices to implement:
    monitoring performance of a migration of data from a first data store that stores the data and that is hosted external to the provider network to a second data store that is hosted as part of another service of the provider network, wherein the monitoring detects an error during the performance of the data store;
    in response to detecting the error:
        identifying one or more responsive actions to modify performance of the migration of the data according to the error; and
        performing the one or more responsive actions to modify performance of the migration.

16. The non-transitory, computer-readable storage medium of claim 15, wherein the program instructions cause the one or more computing devices to further implement providing user interface elements to initiate performance of at least one of the responsive actions via a user interface.

17. The non-transitory, computer-readable storage medium of claim 15, wherein one of the identified responsive actions is a migration analysis that validates the migration task.

18. The non-transitory, computer-readable storage medium of claim 15, wherein one of the identified responsive actions is a corrective action that modifies performance of the migration to correct the detected error.

19. The non-transitory, computer-readable storage medium of claim 15, wherein the corrective action is automatically performed without receiving user input to select the corrective action for performance.

20. The non-transitory, computer-readable storage medium of claim 15, wherein the program instructions cause the one or more computing devices to implement continuing the migration in response to the performing the responsive actions.

* * * * *